US012789255B2

(12) United States Patent
Ruzek

(10) Patent No.: US 12,789,255 B2
(45) Date of Patent: Nov. 10, 2026

(54) METHOD FOR MANUFACTURING A BERYLLIUM-BASED ARTICLE

(71) Applicant: Materion Corporation, Mayfield Heights, OH (US)

(72) Inventor: Andrew Ruzek, Mayfield Heights, OH (US)

(73) Assignee: Materion Corporation, Mayfield Heights, OH (US)

( * ) Notice: Subject to any disclaimer, the term of this patent is extended or adjusted under 35 U.S.C. 154(b) by 606 days.

(21) Appl. No.: 18/472,664

(22) Filed: Sep. 22, 2023

(65) Prior Publication Data

US 2024/0100599 A1 Mar. 28, 2024

Related U.S. Application Data

(60) Provisional application No. 63/409,101, filed on Sep. 22, 2022.

(51) Int. Cl.

| | |
|---|---|
| ***B22F 10/28*** | (2021.01) |
| ***B23K 26/342*** | (2014.01) |
| ***B33Y 10/00*** | (2015.01) |
| ***B33Y 70/00*** | (2020.01) |

(52) U.S. Cl.

CPC ............ *B22F 10/28* (2021.01); *B23K 26/342* (2015.10); *B33Y 10/00* (2014.12); *B33Y 70/00* (2014.12); *B22F 2201/01* (2013.01)

(58) Field of Classification Search

CPC ...... B22F 10/28; B22F 2201/01; B22F 10/64; B22F 12/20; B22F 12/90; B22F 2003/1032; B22F 1/09; B22F 1/17; B22F 10/32; B22F 10/38; B22F 1/05; B23K 26/342; B33Y 10/00; B33Y 70/00; B33Y 40/20; B33Y 50/02; B33Y 80/00; C22C 1/047; C22C 25/00

USPC ........................................................... 419/53

See application file for complete search history.

(56) References Cited

U.S. PATENT DOCUMENTS

| | | | |
|---|---|---|---|
| 4,017,333 A | 4/1977 | Webster et al. | |
| 5,066,324 A | 11/1991 | Perepezko et al. | |
| 10,851,440 B2 | 12/2020 | Darling et al. | |
| 11,364,680 B1 | 6/2022 | Ramos et al. | |
| 11,379,637 B2 | 7/2022 | Collins et al. | |
| 2016/0167133 A1 * | 6/2016 | Yurko | B22F 1/102 428/548 |
| 2024/0051023 A1 | 2/2024 | Ruzek | |
| 2024/0076762 A1 | 3/2024 | Ruzek | |
| 2024/0101439 A1 | 3/2024 | Ruzek | |

FOREIGN PATENT DOCUMENTS

| | | |
|---|---|---|
| CN | 104630524 A | 5/2015 |
| GB | 960008 A | 6/1964 |
| WO | 2022122670 A1 | 6/2022 |

OTHER PUBLICATIONS

Han, "The role of solutes in grain refinement of hypoeutectic magnesium and aluminum alloys," Journal of Magnesium and Alloys, vol. 10 , Issue 7, (Jul. 2022) , pp. 1846-1856.

* cited by examiner

*Primary Examiner* — Danielle M. Carda
(74) *Attorney, Agent, or Firm* — COZEN O'CONNOR

(57) ABSTRACT

Methods for manufacturing a beryllium-based article object comprising beryllium by depositing layers of beryllium. An element is added to the beryllium that dissolved to form a secondary phase to limit columnar grain. Grain refinement allows the beryllium article to have beneficial properties in terms of strength and durability.

16 Claims, No Drawings

METHOD FOR MANUFACTURING A BERYLLIUM-BASED ARTICLE

CROSS REFERENCE TO RELATED APPLICATIONS

This application claims priority to U.S. Provisional Application No. 63/409,101, filed Sep. 22, 2022, which is fully incorporated by reference herein.

TECHNICAL FIELD

The present disclosure relates to a method for manufacturing a beryllium-based article. In particular the method produces beryllium-based articles with improved grain structure by adding an element that dissolves in the molten beryllium, promoting fine grain structure and limiting columnar grain structure. The improved grain structure leads to improved strength and processing.

BACKGROUND

Beryllium is a metal with highly desirable properties. These include high stiffness (Young's modulus=287 GPa), low density (1.85 g/cc), a high elastic modulus (130 GPa), high specific heat (1925 J/kg·K), high thermal conductivity (216 W/m·K), and a low coefficient of linear thermal expansion ($11.4\times10^{6}$/° K). As a result, beryllium and its composites are useful in airborne and spaceborne structures, high-performance engines and brakes, and electronic components for thermal performance and vibration damping. Beryllium and its composites are also useful in several different applications, including combustion applications, hypersonic vehicles, computer parts, optics for space- and ground-based systems, satellite structures, solar energy collectors, and nuclear energy growth applications.

One limitation is that casting methods are unsuitable for manufacturing a beryllium product, and lead to columnar solidification. Beryllium is a highly reactive metal with a high melting point, making it susceptible to reaction with mold-wall materials to form beryllium compounds (BeO, etc.) that become entrapped in the solidified metal. In addition, the grain size is greater than 500 microns and typically much higher up to 50,000 microns. This is far too large to meet strength requirements and results in a brittle material. Further attempts to refine grains through mechanical working have not met with commercial success. To overcome the beryllium production problem, beryllium powder has been used. Beryllium powder can be formed by ball milling, disk grinding, or gas atomizing process. The powder is consolidated into ingots that can be further processed into shaped components of beryllium. This process requires careful handling of the beryllium powder. In addition, the powder process has low material utilization that leads to inefficiencies and increased costs. The powder process is also limited in forming complex shapes.

Objects built by depositing layers may allow for complex shapes but still suffer from poor crystalline structures due to a lack of plastic deformation from mechanical forming. As the layers are built in one direction the solidification tends to result in poor microstructure and columnar grains are prevalent. Undesirable reductions in mechanical properties result in a loss of strength and durability.

There still remains a need to eliminate columnar solidification for manufacturing beryllium-based articles having reduced grain size in an efficient manner.

SUMMARY

The present disclosure provides a method of manufacturing a beryllium-based article, in which an element, such as aluminum, silicon and/or silver, is added to beryllium powder. The element added to the beryllium powder may influence thermal activity. Once the element is added, this may alter the molten pool behavior and result in fine grain structure with limited columnar structure. Improvements in terms of strength and durability may be achieved for beryllium-based articles, including those produced with complex three dimensional shapes.

In one embodiment, there is provided a method comprising a layer comprising the beryllium powder and the element, such as aluminum, silicon and/or silver, may be deposited on a surface, and energy may be applied to at least a portion of the layer from a laser or electron beam, for example, to form molten beryllium in which at least a portion of the element is dissolved. The molten beryllium may then be solidified to form a secondary phase from the dissolved element, and the process of deposition, heating, and solidification may be repeated over successive layers to form a beryllium-based article. In one embodiment, the secondary phase may be dispersed between the beryllium grains. In one embodiment, the beryllium has an average grain size of 1 to 80 microns.

In one embodiment, there is provided a method comprising manufacturing a beryllium-based article, the method comprising adding an element and a nucleant to beryllium powder; depositing a layer comprising the beryllium powder on a surface; applying energy to at least a portion of the layer to form molten beryllium, wherein at least a portion of the element is dissolved in the molten beryllium; solidifying the molten beryllium, wherein the beryllium has an average grain size from 1 to 80 microns; and repeating the depositing/applying/solidifying for successive layers to form the beryllium-based article. In one embodiment, the element is effective for growth restriction and segregation of the nucleants. Preferably, the nucleants may include beryllium titanium, beryllium chromium, iron beryllium, beryllium zirconium, tantalum beryllide, beryllium molybdenum, niobium beryllium, beryllium tungsten, beryllium strontium, and/or beryllium hafnium.

These and other non-limiting characteristics are more particularly described below.

DETAILED DESCRIPTION

The present disclosure may be understood more readily by reference to the following detailed description of desired embodiments and the examples included therein. In the following specification and the claims which follow, reference will be made to a number of terms which shall be defined to have the following meanings.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present disclosure. All publications, patent applications, patents and other references mentioned herein are incorporated by reference in their entirety. The materials, methods, and examples disclosed herein are illustrative only and not intended to be limiting.

The singular forms "a", "an", and "the" include plural referents unless the context clearly dictates otherwise.

As used in the specification and in the claims, the term "comprising" may include the embodiments "consisting of" and "consisting essentially of". The terms "comprise(s)", "include(s)", "having", "has", "can", "contain(s)", and variants thereof, as used herein, are intended to be open-ended transitional phrases that require the presence of the named ingredients/steps and permit the presence of other ingredients/steps. However, such description should be construed as also describing compositions or methods as "consisting of" and "consisting essentially of" the enumerated ingredients/steps, which allows the presence of only the named ingredients/steps, along with any impurities that might result therefrom, and excludes other ingredients/steps.

Numerical values in the specification and claims of this application, as they relate to compositions, articles or powders, reflect average values for a composition that may contain individual polymers of different characteristics. The numerical values disclosed herein should be understood to include numerical values which are the same when reduced to the same number of significant FIGURES and numerical values which differ from the stated value by less than the experimental error of conventional measurement technique of the type described in the present application to determine the value.

All ranges disclosed herein are inclusive of the recited endpoint and independently combinable (for example, the range of "from 1 micron to 80 microns" is inclusive of the endpoints, 1 micron and 80 microns, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" should also be considered as disclosing the range defined by the absolute values of the two endpoints. For example, the expression "from about 2 to about 4" also discloses the range "from 2 to 4". The term "about" may refer to plus or minus 10% of the indicated number. For example, "about 10%" may indicate a range of 9% to 11%, and "about 1" may mean from 0.9-1.1.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

As described herein, there is a method for manufacturing a beryllium-based article. The process comprises adding an element to beryllium powder, and preferably an element that at least partially dissolves in the molten beryllium. The presence of the element or solute in the molten beryllium is capable of affecting grain refinement by slowing down the growth of the solid and assisting in the segregation of nucleants. This mechanism results in solute enrichment near the solidifying interface. For purposes of the present disclosure, the element comprises aluminum, silicon, and/or silver. During solidification of molten beryllium, the dissolved element may promote the formation of a secondary phase. In one embodiment, the secondary phase may promote fine grain size while beneficially limiting columnar structures. Without being bound by theory, the presence of the at least partially dissolved element may contribute to the grain refinement of the beryllium-based article.

As used herein the term "dissolves" means that the element solubilizes in the molten beryllium forming a homogeneous solution.

In one embodiment, the beryllium-based article is made through a series of layers, where each layer is made by applying energy to a beryllium powder followed by solidification. In one embodiment, an element may be added to beryllium powder that is deposited on a surface, and the beryllium powder may be heated by applying energy thereto to produce molten beryllium in which at least a portion of the element is dissolved in the molten beryllium. In one embodiment, the element is totally dissolved in the molten beryllium.

The undissolved portions of the element may provide nucleation sites, while the dissolved portion may be redistributed during solidification. In one embodiment, the molten beryllium may be solidified to form a secondary phase from the dissolved element. In one embodiment, the secondary phase may be dispersed between grains of beryllium after the successive depositing/applying/solidifying. The aforementioned grain refinement of beryllium-based articles can lead to improved strength and processing when forming an article with a series of layers. In one embodiment, the beryllium-based article may have an average grain size from 1 to 80 microns, e.g., from 1 to 75 microns, from 1 to 60 microns, from 1 to 50 microns, from 1 to 40 microns, from 5 to 40 microns, from 5 to 25 microns, from 5 to 15 microns, or from 10 to 15 microns. In one embodiment, a portion of the grains of the beryllium-based article may have an aspect ratio of less than 3:1. In particular, at least 75% of the grains of the beryllium-based article may have an aspect ratio of less than 3:1, e.g., less than 2.5:1 or less than 2:1. Average grain size and aspect ratio may be determined using optical imaging, such as SEM imaging, and by using the comparison, planimetric, or intercept parameters of ASTM E 112-12.

Elements having large growth restriction factors are useful as grain refiners to slow down the grain growth of the beryllium. In one embodiment, aluminum, silicon, silver, and/or combinations thereof are efficient solutes for grain refining. A sufficient amount of the element is added to achieve the desired grain refinement. In one embodiment, the element comprises from 0.1 wt. % to 25 wt. % of the total weight of the beryllium-based article, e.g., from 0.1 wt. % to 20 wt. %, from 0.25 wt. % to 15 wt. %, from 0.25 wt. % to 10 wt. %, from 0.25 wt. % to 5 wt. %, from 0.5 wt. % to 5 wt. %, or from 0.5 wt. % to 1.5 wt. %. When the amount of the element is greater than 25 wt. % the element tends to become more challenging to dissolve.

The element may be added to a beryllium powder. In one embodiment, a portion of the element may be bounded on the surface of the beryllium powder. Preferably, the element does not react with the beryllium powder while being added.

In one embodiment, a secondary phase forms from the element as the molten beryllium solidifies. In one embodiment, the secondary phase is dispersed between the beryllium grains after the molten beryllium solidifies.

In one embodiment, the element added to the beryllium powders includes metals that provide nucleation sites for the beryllium. The elements disclosed herein may affect the nucleation through interfacial segregation and growth restrictions to influence grain refinement. The element may be present as a loose powder, a paste, or a suspension that may be combined with beryllium. In one embodiment, the element remains unreacted when combined with beryllium powders. There are several ways to add the element to the beryllium powders, such as mixing, blending, atomization, mechanical alloying, resonant mixing, or combinations thereof. Resonant mixing is useful when adding the element to the a beryllium powder with a different size to achieve a thorough mix. In one embodiment, resonant mixing induces non-contact acoustic mixing with acoustic waves in the frequency from 20 to 80 Hz to achieve good mixing in a short time without inducing fractures or stress to the beryllium powder. In one embodiment, the element comprises silver, aluminum, silicon, and/or combinations thereof.

In one embodiment, a beryllium powder containing the element is deposited as a layer, thus there is no need for adding step prior to deposition. Accordingly, there is provided a method of manufacturing a beryllium-based article comprising depositing a layer comprising a beryllium powder including an element selected from the group consisting of silver, silicon and aluminum on a surface, cycling at least a portion of the layer above a temperature that is greater than or equal to the temperature required to form molten beryllium, solidifying the layer, and repeating the depositing/cycling/solidifying for successive layers, wherein each of the successive layers comprises the beryllium powder. Preferably, the beryllium-based article has an average grain size from 1 to 80 microns.

In one embodiment, the element may be a metal powder. The metal powder may have an aspect ratio (mean length to mean width) from 1:1 to 100:1, e.g., from 1:1 to 50:1, from 1:1 to 20:1, from 1:1 to 10:1 or from 1:1 to 5:1. The metal powder may be smaller than the beryllium powder. The metal powder may have an average ($D_{50}$) particle size of less than or equal to 10 microns, e.g., less than 8 microns, less than 5 microns, less than 2.5 microns, less than 2 microns or less than 1 micron. In some embodiments, the metal powder may have an average ($D_{50}$) that is a nanoparticle, e.g., less than 1 micron. In some embodiments, the nanoparticles may have an average ($D_{50}$) that is from 10 to 1000 nanometers, e.g., 25 to 950 nanometers, 50 to 900 nanometers, 100 to 800 nanometers, or from 300 to 700 nanometers. Accordingly, the metal powder may have an average ($D_{50}$) particle size from 0.0001 to 10 microns, e.g., from 0.0005 to 7.5 microns, from 0.001 to 5 microns, from 0.01 to 2.5 microns, or from 0.1 to 1.5 microns.

In one embodiment, the beryllium powder may comprise beryllium. Various amounts of beryllium may be suitable for the embodiments disclosed herein. In one exemplary embodiment, the beryllium powder comprises beryllium in an amount of greater than 40% by weight. In one embodiment, the beryllium powder may comprise beryllium in an amount of 40% by weight to 95% by weight. More preferably, the beryllium powder may comprise beryllium in an amount from 50 to 95% by weight, e.g. from 60 to 95% by weight or from 80 to 95% by weight.

In another embodiment, the beryllium powder may be S-65 grade (99.2% minimum Be content, 0.9% max BeO), S-200 (98.5% minimum Be content), 0-30 (Hot Isostatically Pressed beryllium, minimum 99% Be content, 0.5% max BeO), and, all available from Materion Corporation. The beryllium powder may have an aspect ratio (mean length to mean width) from 1:1 to 100:1, e.g., from 1:1 to 50:1, from 1:1 to 20:1, from 1:1 to 10:1 or from 1:1 to 5:1. In one embodiment, the beryllium powder may be a spherical shape. The beryllium powder may have an average ($D_{50}$) particle size of from 1 micron to 200 microns, e.g., from 5 microns to 175 microns, from 10 microns to 150 microns, from 15 microns to 100 microns, from 25 microns to 70 microns or from 25 microns to 50 microns. The particle size is the $D_{50}$, or the diameter at which a cumulative percentage of 50% of the particles by volume is attained. Powders that are smaller than 200 microns may be constructively used to form beryllium-based articles with reduced grain refinement. When needed, the beryllium powder may be sieved to achieved a desired size.

In one embodiment, the beryllium powder may be in the form of particles having a core-shell structure, with the beryllium making up the core and a continuous or a semi-continuous coating making up the shell. Coating the beryllium may be achieved by ball milling, resonance mixing, spray binding, spray drying, laser ablation, electrical-discharge machining, and atomic layer deposition. In some embodiments, the coating includes nickel, either pure nickel or in the form of a nickel alloy. The core may be from 0.1 wt % to 99.9 wt % of the particles, or from 50 wt % to 99.9 wt %, or from about 92 wt % to less than 100 wt % of the particles. In some embodiments, the coating may be from 0.1 wt % to 99.9 wt % of the particles, or from 0.1 wt % to 50 wt %, or from greater than zero wt % to about 8 wt % nickel. In particular embodiments, the beryllium powder includes from about 92 wt % to less than 100 wt % beryllium and from greater than zero wt % to about 8 wt % nickel. Generally, it is contemplated that the coating forms the particles for grain refinement.

In one embodiment, the beryllium powder may have at least a portion of the element bound to the surface of the beryllium powder.

The element may be combined with beryllium in effective amounts to promote fine grain size and limit columnar structure. In one embodiment, the amount of the element combined with the beryllium powder may be from 0.1 to 25% by weight, based on the total weight of the beryllium powder. More preferably, the element may be present in an amount from 0.1 to 10% by weight, e.g., from 0.25 to 10% by weight, from 0.25 to 8% by weight, from 0.5 to 5% by weight, or from 0.5 to 1.5% by weight In one embodiment, the element is silver that may be added to beryllium powder in an effective amount to promote fine grain size and limit columnar structures. Silver may be effective in grain refinement to produce an article that has improved strength and performance. In one embodiment, silver may be present in the beryllium powder in amounts from 0.1 to 25% by weight, based on the total weight of the beryllium powder. More preferably, the silver may be present in an amount from 0.1 to 10% by weight, e.g., from 0.25 to 10% by weight, from 0.25 to 8% by weight, from 0.5 to 5% by weight, or from 0.5 to 1.5% by weight.

In one embodiment, the element is aluminum that may be combined with beryllium in an effective amount to promote fine grain size and limit columnar structures. Aluminum may be effective in grain refinement to produce an article that has improved strength and performance. In one embodiment, aluminum may be present in the beryllium powder in amounts from 0.1 to 25% by weight, based on the total weight of the beryllium powder. More preferably, the aluminum may be present in an amount from 0.1 to 10% by weight, e.g., from 0.25 to 10% by weight, from 0.25 to 8% by weight, from 0.5 to 5% by weight, or from 0.5 to 1.5% by weight.

In one embodiment, the element is silicon that may be combined with beryllium in an effective amount to promote fine grain size and limit columnar structures. Silicon may be effective in grain refinement to produce an article that has improved strength and performance. In one embodiment, silicon may be present in the beryllium powder in amounts from 0.1 to 25% by weight, based on the total weight of the beryllium powder. More preferably, the silicon may be present in an amount from 0.1 to 10% by weight, e.g., from 0.25 to 10% by weight, from 0.25 to 8% by weight, from 0.5 to 5% by weight, or from 0.5 to 1.5% by weight.

In one embodiment, the element is a combination of silver, silicon and/or aluminum that may be combined with beryllium in an effective amount to promote fine grain size and limit columnar structures. A combination of silver, silicon and/or aluminum may be effective in grain refinement to produce an article that has improved strength and performance. In one embodiment, the combined silver, silicon and/or aluminum may be present in the beryllium powder in amounts from 0.1 to 25% by weight, based on the total weight of the beryllium powder. More preferably, the combined silver, silicon and/or aluminum may be present in an amount from 0.1 to 10% by weight, e.g., from 0.25 to 10% by weight, from 0.25 to 8% by weight, from 0.5 to 5% by weight, or from 0.5 to 1.5% by weight.

The beryllium powder may also comprise with nucleants for grain refinement. In one embodiment, the beryllium powder may comprise an intermetallic compound of beryllium that functions as a nucleant. In one embodiment, the intermetallic compound of beryllium is a beryllide such as beryllium titanium ($Be_{12}Ti$, $Be_2Ti$), beryllium chromium ($Be_2Cr$ or $Be_{12}Cr$), iron beryllium ($FeBe_5$), beryllium zirconium ($Be_{13}Zr$, $Be_5Zr$, $Zr_2Be_{17}$), tantalum beryllide ($TaBe_2$, $Ta_2Be_{17}$, $TaBe_{12}$ or $TaBe_{17}$), beryllium molybdenum ($Be_2Mo$, $Be_{12}Mo$, $Be_{22}Mo$), niobium beryllium ($NbBe_2$, $NbBe_3$, $Nb_2Be_{17}$, $NbBe_{12}$), beryllium tungsten ($Be_{22}W$), beryllium strontium ($Be_{13}Sr$), and/or beryllium hafnium ($Be_5Hf$). Once the particles are formed the energy of nucleation of the beryllium is lowered to achieve grain refinement. Without limitation, the nucleants may be present in an amount from 0 to 40% by weight based on the total weight of the beryllium powder, e.g., from 0 to 35% by weight, from 0 to 30% by weight, from 0.5 to 35% by weight, from 1 to 30% by weight, or from 1 to 20% by weight.

In one embodiment, the beryllium powder may be in the form of particles, such as a powder. The particles have a D50 average size from 10 to 50 microns, e.g., from 15 to 50 microns, from 20 to 45 microns, or from 25 to 40 microns.

Method

By cycling several layers of deposited beryllium powder a beryllium-based article may be formed. After applying energy to form molten beryllium, the added element in the beryllium powder may at least partially dissolve therein and from a secondary phase upon solidification. In one embodiment, complex shapes may be formed from the articles having multiple layers. In one embodiment, the resulting shape may be a geometric shape or a three-dimensional shape that is formed from multiple layers. In one embodiment, the method deposits an initial layer, preferably at a relatively high rate. In one embodiment, the initial layer may be uniformly deposited by depositing the beryllium powder on a surface of a substrate. In some embodiments, the initial layer may be deposited on a surface such as a substrate, platform, or base plate.

The process may begin by depositing the initial layer in a build box. Preferably the beryllium powder, to which the element is added, is transferred to the build box with minimal loss or contamination of the surrounding area. The build box comprises a surface, e.g., build platform, and side walls. The build platform is generally a flat surface on which the successive layers are deposited. The build platform may move along a vertical z-axis based on signals provided from a computer-operated controller. The side walls cooperate with the build platform to form a "box" that contains the deposited beryllium powder. Generally, the side walls remain in a fixed location, and the build platform moves downward to permit the next layer of beryllium powder to be deposited.

The initial layer may be deposited in a pre-determined pattern on the surface. In some embodiments, the preset pattern is determined based on the layers of a computer-aided design (CAD) model. Any suitable technique to deposit the initial layer is suitable for the method including spreading, coating, brushing, rolling, spraying, or dispensing. In one embodiment, one or more deposition heads are used and are moved in horizontal x-y plane. A controller may be used to move the one or more deposition heads specified by the design. The horizontal x-y plane is a plane defined by an x-axis and a y-axis where the x-axis, the y-axis, and the z-axis are orthogonal to each other.

In some embodiments, the deposition occurs under an inert gas atmosphere. In one embodiment, the deposition may occur in a reducing atmosphere to reduce the formation of oxides. After the layer of beryllium powder is deposited, energy may be applied in a reducing atmosphere. In one embodiment, the reducing atmosphere contains less than or equal to 20 vol % of oxygen, e.g., less than 15 vol. %, less than 10 vol. % or less than 5 vol. %.

In one embodiment, the each layer may be deposited in an even manner. The initial layer may have a thickness from 20 to 200 microns, e.g., from 25 to 150 microns, from 25 to 110 microns, from 30 to 100 microns, from 35 to 75 microns, or from 40 to 60 microns. In some embodiments, the layer may be formed by compacting the deposited beryllium powder in an optional compaction method. Compacting powders may be desired to provide thin layers using a mechanical compactor such as doctor blades or double rolling or electrostatic force.

Subsequent to the deposition of the initial layer, the process uses a cycling process to heat the initial layer to a temperature sufficient to form molten beryllium and then subsequently cool the layer. In one embodiment, the cycling process may be rapid to increase productivity and efficiency. In one embodiment, the cycling further comprises exposing the deposited initial layer to an energy source. The cycling transitions through a thermal gradient at a high rate to solidify the beryllium-based article. In one embodiment, the energy source may be directed to at least a portion of the initial layer. The energy source may produce localized or focused energy to heat at least a portion of the initial layer, preferably to heat at least a portion of the initial layer. The energy source may be an electron beam or laser beam having a power density from $10^3$ W/mm$^2$ to $10^7$ W/mm$^2$, e.g., from $10^4$ W/mm$^2$ to $10^7$ W/mm$^2$, or from $10^5$ W/mm$^2$ to $10^6$ W/mm$^2$. Operating the energy source at a power of less than $10^7$ W/mm$^2$ is sufficient to initiate heat above a temperature that is sufficient to form molten beryllium. In one embodiment, the effective diameter of the energy source may be from 10 to 200 microns, e.g., from 25 to 150 microns, or from 35 to 100 microns. The scanning speed of the energy source may be 10 mm/s to 2000 mm/s, e.g., from 50 mm/s to 1500 mm/s or from 100 mm/s to 1000 mm/s. The raster width of the energy source may be from 50 to 500 microns, e.g., from 75 to 450 microns, from 75 to 400 microns, or from 100 to 350 microns. In one embodiment, the layer thickness may be from 20 microns to 200 microns, e.g., from 25 microns to 175 microns or from 50 microns to 150 microns.

In one embodiment, the energy source and/or another source heats the initial layer to a temperature sufficient to form molten beryllium. In one embodiment, temperature may be from 1000° C. to 1500° C., e.g. from 1100° C. to 1450° C., from 1200° C. to 1400° C., or from 1290° C. to 1325° C. In one embodiment, the cycling process may be rapid to increase productivity. The cycling process may last less than or equal to 300 seconds, e.g., less than 240 seconds, less than 180 seconds, less than 120 seconds, less than 90 seconds, less than 60 seconds, less than 50 seconds, less than 45 seconds, less than 30 seconds, less than 25 second, less than 20 seconds, less than 10 second, less than 5 second, less than 1 second, or less than 0.5 second. In terms of ranges, in one embodiment, the rapid cycling may be from 0.01 to 300 seconds, e.g., from 0.01 to 240 seconds, from 0.1 to 180 seconds, from 0.2 to 120 seconds, from 0.2 to 90 seconds, from 0.25 to 60 seconds, from 0.5 to 60 seconds, from 0.5 to 30 seconds, from 0.5 to 15 seconds, or from 0.5 to 10 seconds.

Unless pre-heating is used, the initial layer may be deposited at room temperature (20 to 25° C.). In some embodiments, the deposited initial may be pre-heated in the build box to a temperature of at least 100° C., e.g., at least 120° C., or 150° C., at least 200° C., at least 400° C., at least 450° C., or at least 500° C.

Operating the method under a reduced atmospheric pressure or under vacuum may provide quality control for the layers and beryllium-based article material. Nonetheless, in some embodiments, the method may be operated under atmospheric pressure.

As part of the cycling process, the process also cools the deposited layer. In one embodiment, minimum cooling rates may be greater than 10° C./min, e.g., greater than 15° C./min or greater than 20° C./min. In some embodiments, the cooling rates may be greater than 1000° C./min, e.g., greater than 10,000° C./min, to achieve solidification. The cooling or undercooling may be achieved at a cooling rate from 10° C./min to 10,000° C./min, e.g., from 20° C./min to 5,000° C./min, from 50° C./min to 3,000° C./min or from 100° C./min to 1000° C./min. In one embodiment, the cooling may be in the building direction of the layers. During the solidification, a secondary phase may form from the dissolved element. The secondary phase may be dispersed between the beryllium grains, and may contribute to grain refinement.

A coolant may be used to achieved the desired cooling by removing excess energy applied to the layer. The coolant may further reduce temperature gradients in the layers that tend to form columnar grains and thus improves the grain refinement. In one embodiment, the coolant may be an inert gas such a nitrogen or a noble gas, in particular argon. The coolant may be a mix of gases. The coolant may be delivered to the layer as a focuses gaseous stream at a temperature of less than or equal to 100° C., e.g., less than or equal to 75° C., less than or equal to 50° C., less than or equal to 25° C., less than or equal to 0° C., less than or equal to −10° C., less than or equal to −25° C. or less than or equal to −50° C. In terms of ranges the coolant may be applied at a temperature from −200° C. to 100° C., e.g., from −150° C. to 50° C. or from −100° C. to 25° C., including subranges therein. The flow of the coolant may be adjusted as the layers are deposited and the flow rate may be less than or equal to 500 L/min, e.g., less than 250 L/min or less than 100 L/min.

The thermal conditions of the article may be monitored using infrared temperature sensors, thermocouples, resistance temperature detectors, thermistors, or other suitable temperature sensor. The sensors may monitor the temperature in the region where the energy and/or coolant is applied. In response to the temperature, the process may adjust the cooling rate by adjusting the flow rate, duration or temperature of the coolant.

In one embodiment, the beryllium powder may be heated to a temperature sufficient to form molten beryllium. In one embodiment, at least a portion of the element may be dissolved in the molten beryllium. In one embodiment, the element is totally dissolved in the beryllium. In one embodiment, the content of the dissolved element is less than the total content of the element added to the beryllium. In one embodiment, the content of the dissolved element is less than the total content of the element added to the beryllium. Once dissolved the element is freely available for restricting growth.

In one embodiment, the ratio of the dissolved element to the undissolved element is from 0.1 to 50 to 50 to 0.1; e.g., 0.5 to 40, 1 to 20, 5 to 10, 1 to 1, 10 to 5, 20 to 1, 40 to 0.5, or 50 to 0.1.

The process may continue for successive layers in a similar manner, and thus cycling each layer of deposited beryllium powder and solidifying the molten beryllium in the layer. After allowing a sufficient time for solidifying, one or more successive layers may be deposited in a predetermined pattern on at least a portion of the initial layer opposite of the surface. This continues to build the beryllium-based article where each of the successive layers are deposited on at least a portion of the previously deposited layer. In one embodiment, the successive layers are deposited to achieve a complex shape, such as a three-dimensional shape. The successive layers may be deposited at room temperature or may be pre-heated similarly to the initial layer. In a similar manner, an energy source is directed to at least a portion of the successive layer for cycling at a temperature sufficient to dissolve the element, either partially or totally, in the molten beryllium. In one embodiment, the energy source is controlled within similar operating parameters as the initial layer. Depending on the article, the pattern for each successive layer may be different. In some embodiments, the successive layer(s) may be deposited on at least a portion of the prior or initial layers.

In some embodiments, the surface or build plate may be lowered by the thickness of the next successive layer. The thickness of the successive layers may vary and in one embodiment, the successive layer may have a thickness from 20 to 200 microns, e.g., from 25 to 150 microns, from 25 to 110 microns, from 30 to 100 microns, from 35 to 75 microns, or from 40 to 60 microns. In some embodiments, each successive layer may have a similar thickness or the thickness may accommodate the beryllium-based article. The method may continue with repeated deposition, cycling and precipitation until the desired beryllium-based article is formed. In one embodiment a three-dimensional object is formed. In one embodiment, the beryllium-based article may be formed by one or more successive layers, e.g., at least 5 successive layers, at least 10 successive layers, or at least 20 successive layers. For some articles, several hundred layers may be used and thus the number of layers are not limited.

The orientation of the microstructure is not limited to the build direction of the successive layers. The microstructure of the beryllium-based article may contain a plurality of dendrite layers having differing primary growth-direction angles with respect to each other. This provides for a beryllium-based article that is crack-free.

In some embodiments, the methods further include curing the plurality of layers prior to sintering the preform. In one embodiment, the beryllium-based article may be solutionized followed by a quench. The beryllium-based article may be annealed for a period from 6 to 12 hours, e.g., from 8 to 10 hours. The quenching rate may be greater than 25° C./min, e.g., greater than 50° C./min or greater than 100° C./min. The quenching may be done slowly at room temperature. The annealed article can be finished, for example by polishing or plating. The surface roughness of the article may be reduced, for example, via bead blasting or barrel finishing. In some embodiments, the manufactured beryllium-based article may have loose or unfused particles in one or more of the layers. The unfused particles may be removed by blowing or vacuuming as needed.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

As used below, any reference to a series of embodiments is to be understood as a reference to each of those embodiments disjunctively (e.g., "Embodiments 1-4" is to be understood as "Embodiments 1, 2, 3, or 4").

Embodiment 1 is a method of manufacturing a beryllium-based article, the method comprising adding an element and a nucleant to beryllium powder; depositing a layer comprising the beryllium powder on a surface; applying energy to at least a portion of the layer to form molten beryllium, wherein at least a portion of the element is dissolved in the molten beryllium; solidifying the molten beryllium, wherein the beryllium has an average grain size from 1 to 80 microns; and repeating the depositing/applying/solidifying steps for successive layers to form the beryllium-based article.

Embodiment 2 is an embodiment of embodiment 1, wherein the nucleant comprises beryllium titanium, beryllium chromium, iron beryllium, beryllium zirconium, tantalum beryllide, beryllium molybdenum, niobium beryllium, beryllium tungsten, beryllium strontium, and/or beryllium hafnium.

Embodiment 3 is an embodiment of embodiment 1, wherein the beryllium powder comprises from 0 to 40% by weight of the nucleants.

Embodiment 4 is a method of manufacturing a beryllium-based article, the method comprising adding an element to beryllium powder; depositing a layer comprising the beryllium powder on a surface; applying energy to at least a portion of the layer to form molten beryllium, wherein at least a portion of the element is dissolved in the molten beryllium; solidifying the molten beryllium to form a secondary phase from the dissolved element; and repeating the depositing/applying/solidifying steps for successive layers to form the beryllium-based article.

Embodiment 5 is an embodiment of any one of embodiments 1-4, wherein the element comprises aluminum, silicon or silver.

Embodiment 6 is an embodiment of any one of embodiments 1-5, wherein the element is totally dissolved in the molten beryllium.

Embodiment 7 is an embodiment of any one of embodiments 1-6, wherein the secondary phase is dispersed between grains of beryllium.

Embodiment 8 is an embodiment of any one of embodiments 1-7, wherein the grains of beryllium has an average grain size from 1 to 80 microns.

Embodiment 9 is an embodiment of any one of embodiments 1-7, wherein the grains of beryllium has an average grain size from 5 to 40 microns.

Embodiment 10 is an embodiment of any one of embodiments 1-7, wherein the grains of beryllium has an average grain size from 5 to 25 microns.

Embodiment 11 is an embodiment of any one of embodiments 1-10, wherein the element and/or nucleant is added to the beryllium powder by blending, atomization, mechanical alloying, or resonant mixing.

Embodiment 12 is an embodiment of any one of embodiments 1-11, wherein 0.1 to 25% by weight of the element is added to beryllium.

Embodiment 13 is an embodiment of any one of embodiments 1-12, wherein 0.1 to 10% by weight of the element is added to beryllium.

Embodiment 14 is an embodiment of any one of embodiments 1-13, wherein an electron beam or laser is used to apply energy to at least a portion of the layer.

Embodiment 15 is an embodiment of any one of embodiments 1-14, further comprising depositing the layer in a reducing atmosphere.

Embodiment 16 is an embodiment of any one of embodiments 1-15, wherein the reducing atmosphere has a volume concentration of 10% by volume or less of oxygen or other oxidizing agents.

Embodiment 17 is an embodiment of any one of embodiments 1-16, wherein the beryllium powder have a D50 average size from 10 to 50 microns.

While the invention has been described in detail, modifications within the spirit and scope of the invention will be readily apparent to those of skill in the art. In view of the foregoing discussion, relevant knowledge in the art and references discussed above in connection with the Background and Detailed Description, the disclosures of which are all incorporated herein by reference. In addition, it should be understood that aspects of the invention and portions of various embodiments and various features recited below and/or in the appended claims may be combined or interchanged either in whole or in part. In the foregoing descriptions of the various embodiments, those embodiments which refer to another embodiment may be appropriately combined with other embodiments as will be appreciated by one of skill in the art. Furthermore, those of ordinary skill in the art will appreciate that the foregoing description is by way of example only, and is not intended to limit.

What is claimed:

1. A method of manufacturing a beryllium-based article, the method comprising:

adding an element and a nucleant to beryllium powder;

depositing a layer comprising the beryllium powder on a surface;

applying energy to at least a portion of the layer to form molten beryllium, wherein at least a portion of the element is dissolved in the molten beryllium;

solidifying the molten beryllium, wherein the beryllium has an average grain size from 1 to 80 microns; and repeating the depositing/applying/solidifying steps for successive layers to form the beryllium-based article, wherein the nucleant comprises beryllium titanium, beryllium chromium, iron beryllium, beryllium zirconium, tantalum beryllide, beryllium molybdenum. niobium beryllium, beryllium tungsten, beryllium strontium, and/or beryllium hafnium.

2. The method of claim 1, wherein the beryllium powder comprises from 0.5 to 35 % by weight of the nucleant.

3. The method of claim 1, wherein the element comprises aluminum, silicon or silver.

4. The method of claim 1, wherein the element is totally dissolved in the molten beryllium.

5. The method of claim 1, wherein 0.1 to 25% by weight of the element is added to beryllium.

6. The method of claim 1, wherein 0.1 to 10% by weight of the element is added to beryllium.

7. The method of claim 1, wherein solidifying the molten beryllium forms a secondary phase from the dissolved element.

8. The method of claim 7, wherein the secondary phase is dispersed between grains of beryllium.

9. The method of claim 1, wherein the beryllium powder comprises from 1 to 20% by weight of the nucleant.

10. The method of claim 1, wherein beryllium has an average grain size from 5 to 40 microns.

11. The method of claim 1, wherein beryllium has an average grain size from 5 to 25 microns.

12. The method of claim 1, wherein the element is added to the beryllium powder by blending, atomization, mechanical alloying, or resonant mixing.

13. The method of claim 1, wherein an electron beam or laser is used to apply energy to at least a portion of the layer.

14. The method of claim 1, further comprising depositing the layer in a reducing atmosphere.

15. The method of claim 14, wherein the reducing atmosphere has a volume concentration of 10% by volume or less of oxygen or other oxidizing agents.

16. The method of claim 1, wherein the beryllium powder have a D50 average size from 10 to 50 microns.

* * * * *